(12) United States Patent
Ranjan et al.

(10) Patent No.: US 9,330,484 B2
(45) Date of Patent: May 3, 2016

(54) PLANE PANORAMA LOCATION CORRECTION IN THREE-DIMENSIONAL MAPPING

(71) Applicant: Earthmine, Inc., Berkeley, CA (US)

(72) Inventors: Darsh Ranjan, Berkeley, CA (US); Jaechoon Chon, Albany, CA (US)

(73) Assignee: HERE Global B.V., Veldhoven (NL)

( * ) Notice: Subject to any disclaimer, the term of this patent is extended or adjusted under 35 U.S.C. 154(b) by 231 days.

(21) Appl. No.: 13/954,547

(22) Filed: Jul. 30, 2013

(65) Prior Publication Data

US 2014/0035906 A1 Feb. 6, 2014

Related U.S. Application Data

(60) Provisional application No. 61/679,009, filed on Aug. 2, 2012, provisional application No. 61/683,342, filed on Aug. 15, 2012.

(51) Int. Cl.
| | |
|---|---|
| G06T 15/00 | (2011.01) |
| G06T 17/05 | (2011.01) |
| G06T 3/40 | (2006.01) |
| G09B 29/00 | (2006.01) |
| G09B 29/10 | (2006.01) |

(52) U.S. Cl.
CPC .............. *G06T 15/00* (2013.01); *G06T 3/4038* (2013.01); *G06T 17/05* (2013.01); *G09B 29/005* (2013.01); *G09B 29/106* (2013.01)

(58) Field of Classification Search
CPC combination set(s) only.
See application file for complete search history.

(56) References Cited

U.S. PATENT DOCUMENTS

| 8,593,506 B2 * | 11/2013 | Peleg et al. ...................... 348/36 |
| 2002/0154812 A1 * | 10/2002 | Chen ..................... G06T 3/4038 382/154 |
| 2007/0008312 A1 * | 1/2007 | Zhou et al. ..................... 345/419 |
| 2011/0043604 A1 * | 2/2011 | Peleg et al. ...................... 348/36 |

FOREIGN PATENT DOCUMENTS

WO 2009-143986 12/2009

OTHER PUBLICATIONS

Dragomir Anguelov et al., Google Street View: Capturing the World at Street Level, 2010, pp. 32-38, IEEE Computer Society.
Gordon Petrie, An Introduction to the Technology-Mobile Mapping Systems, Jan./Feb. 2010, pp. 35-43, GEO Informatics.
Brian Okorn, et al. "Toward Automated Modeling of Floor Plans", Proceedings of the Symposium on 3D Data Processing, Visualization and Transmission, 2010, Espace Saint Martin. Paris, France. XP055089590.
Chris Engels, et al: "Automatic Occlusion Removal from Facades for 3D Urban Reconstruction", Advances concepts for intelligent vision systems, springer Berlin Heidelberg, Berlin. pp. 681-692, 2011.
Dorit Borrmann, et al., The 3D Hough Transform for plane detection in point clouds: A review and a new accumulator design, Jun. 1, 2011.
Eunyoung Kim, et al., Robot and Human Interative Communication, Planar Patch based 3D Environment Modeling with Stereo Camera, Aug. 27, 2007, pp. 516-521.

* cited by examiner

*Primary Examiner* — Maurice L McDowell, Jr.
(74) *Attorney, Agent, or Firm* — Lempia Summerfield Katz LLC (57) ABSTRACT

Correction of the locations of panoramas and associated physical locations in a region are disclosed. The task of correcting the locations of the panoramas is divided into XY location correction followed by Z location correction. The panorama set is filtered to remove extraneous planes. In XY-plane correction, neighboring panoramas are identified using a neighbor graph, and the locations of sets of neighboring planes are constrained to be within a specified distance of one another, and a system of linear equations is constructed to represent the locations of the panoramas. A weighted absolute sum of the constraints is minimized across the entire system using a convex quadratic program solver to derive new locations for the planes. The location of ground planes is similarly corrected using a minimization of errors technique.

18 Claims, 7 Drawing Sheets

PLANE PANORAMA LOCATION CORRECTION IN THREE-DIMENSIONAL MAPPING

CROSS-REFERENCE TO OTHER APPLICATIONS

This application claims the benefit of the filing date under 35 U.S.C. §119(e) of U.S. Provisional Application Ser. No. 61/679,009 filed Aug. 2, 2012 and U.S. Provisional Application Ser. No. 61/683,342 filed Aug. 15, 2012, the entire disclosures of which are hereby incorporated by reference.

In addition, U.S. Provisional Patent Application No. 61/679,006, filed on Aug. 2, 2012, entitled "Three-Dimensional Plane Panorama Creation Through Hough-Based Line Detection" and the international application also entitled "Three-Dimensional Plane Panorama Creation Through Hough-Based Line Detection" and filed under the patent cooperation treaty (PCT) as Application Number PCT/IB2013/056239 on Jul. 30, 2013 are incorporated by reference in their entirety.

BACKGROUND

In general, the disclosure relates to assembling accurate, machine-intelligible, three-dimensional maps, and more particularly, to correcting the location and registration of planes in three-dimensional mapping.

Street-level spatial maps provide a user with a panoramic, three-dimensional map of an area, typically from the perspective of a human on the ground. Besides being of general interest, these kinds of maps can help drivers to appreciate the nuances of a driving route, or to understand what important landmarks actually look like. If the mapping data is accurate enough, three-dimensional panoramic maps can allow property tax assessors, land appraisers, and real estate professionals to do their work quickly, often eliminating the need for at least some types of site visits. Detailed spatial information can also be used to improve emergency service response times and to plan and implement disaster relief efforts, to name but a few applications.

Unfortunately, gathering detailed spatial data is a laborious process. In a typical process, a vehicle with an imaging system and a positioning or navigation system traverses roads and waterways, taking photographs and, in some cases, range measurements as it goes. Typically, the imaging system includes a camera mast mounted on a motor vehicle. The camera mast has a number of cameras on it, and may also include one or more laser systems for gathering ranging data. The navigation system typically includes a global positioning system (GPS) receiver to provide the vehicle's absolute position in space, and may also include a traditional gyroscope-based inertial navigation system, as well as encoders (i.e., sensors) on the vehicle wheels to measure relative position.

The use of a laser ranging system provides highly accurate range data. While it is possible to gather accurate range data by using stereoscopic camera systems, range data gathered by these methods can include more noise and present additional processing challenges.

SUMMARY

One aspect relates to methods for correcting the locations and accuracies of plane panoramas and their associated physical locations. The methods use a two-phase approach in which the two horizontal components of the panorama locations (i.e., their X and Y locations) are corrected first, after which the elevations of the panoramas (i.e., their Z locations) are corrected.

For XY correction, after extraneous planes in the panoramas that do not meet specified thresholds are discarded, neighboring panoramas in the remaining data set are identified. This may be done, for example, by constructing a neighbor graph. A system of linear equations is constructed to represent the locations of the panoramas, and planes of neighboring panoramas are required to be within specific constrained distances of one another, plus or minus an error term. The methods minimize a weighted absolute sum of the error terms across the system of linear equations using a quadratic solver (e.g., a convex quadratic program solver) to derive new X-Y locations for the panoramas.

For Z correction, the ground planes are extracted from the set of panorama data, systems of linear inequalities are constructed to represent the locations of those planes, and ground planes from neighboring panoramas are constrained to lie within specific distances of one another, plus or minus an error term. The methods then minimize a weighted absolute sum of the error terms across the systems of linear inequalities to derive new Z locations for the panoramas. If any of the constraints are grossly violated, the panoramas in question may be declared non-neighboring and the Z correction process repeated.

Other aspects, features, and advantages are set forth in the description below.

BRIEF DESCRIPTION OF THE DRAWING FIGURES

The disclosure is described with respect to the following drawing figures, in which like numerals represent like features throughout the figures, and in which.

DETAILED DESCRIPTION

Once raw spatial data is gathered by a camera and ranging system, the next difficulty in mapping that data lies in converting the raw data into a useable form. In raw form, the spatial data is a "cloud" of points, i.e., the individual pixels of each image taken by the cameras and, if available, the data points from the laser ranging system. Initially, a machine generally has no data indicative of which points in that point cloud relate to which other points.

In order to be useable, that raw data is transformed into a three-dimensional scene constructed from a number of defined planes that are in registration with one another. First, assembling planes from the "cloud" of points is computationally intensive and error prone, and the data itself may be full of noise and, second, once planes are defined from image and ranging data, assembling those planes into a cohesive map or scene can be equally computationally intensive.

Figure 1:
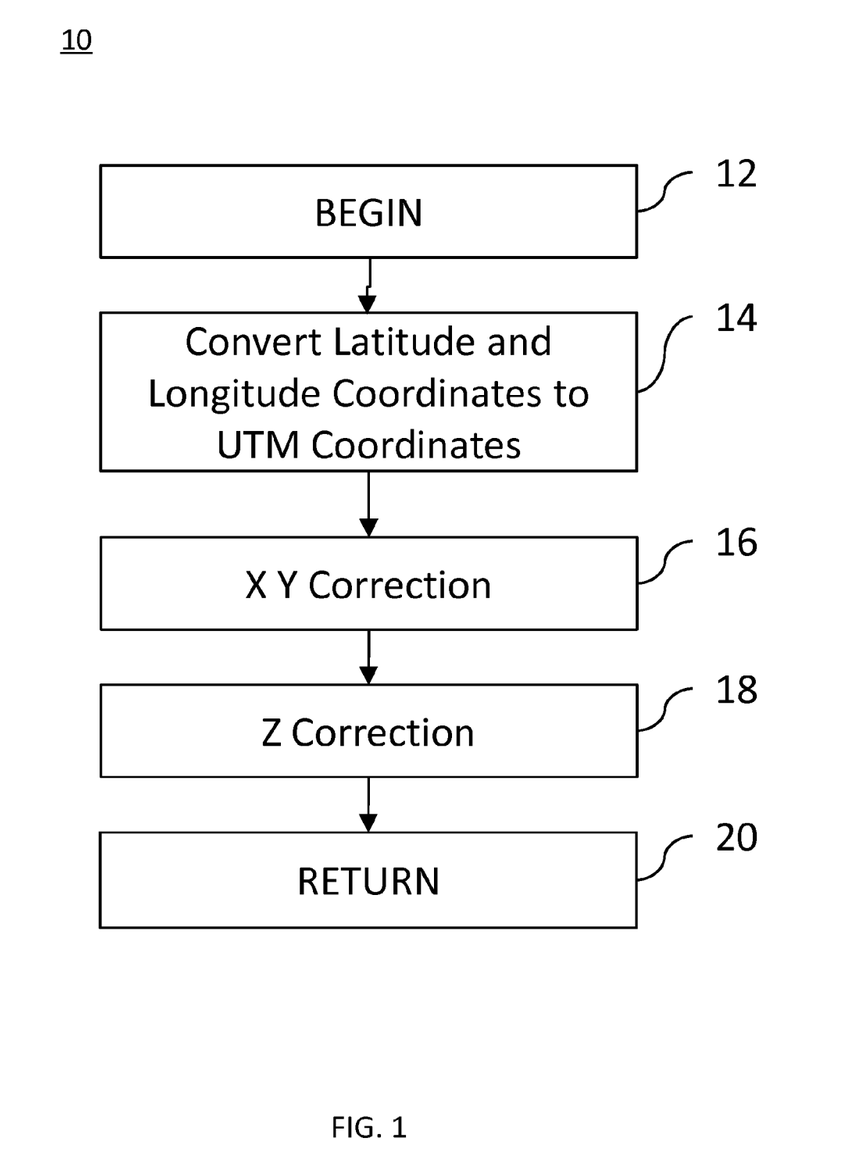
FIG. 1 is a high-level flow diagram of a method for panorama location correction in three-dimensional mapping.

FIG. 1 is a high-level flow diagram of a method for panorama location correction in three-dimensional mapping, generally indicated at 10. It may be assumed, unless otherwise stated, that the tasks of method 10 are performed using a general purpose computing system, and that the tasks of method 10 are implemented in software on that general purpose computing system or performed by a specialized computing system configured to perform the tasks of method 10. In this context, the term "software" refers to sets of machine-readable instructions on a machine-readable medium that are interoperable with a machine to perform the described functions. The machine-readable medium may be a CD-ROM, CD-R, hard disk drive, solid-state drive, another type of optical disk, or flash memory, to name a few options. However, the method may also be implemented in hardware on a special purpose computer, an embedded device, or an application-specific integrated circuit. In some cases, a number of interconnected computers may be networked and used together to perform the tasks of method 10.

The following embodiments may begin with a set of data that comprises a plurality of panoramas. The set of panoramas may be gathered by a variety of procedures and systems. As was described briefly above, the panoramas may be generated by taking 360° photographs of a scene at defined intervals (e.g., every 10 meters), and coupling that photographic data with global positioning system (GPS) and inertial navigation system (INS) data and, if available, laser range data. The data collection may be performed by a specially equipped vehicle that can take simultaneous photographs spanning 360° around the vehicle. In some embodiments, the photographs may be stereoscopic in nature. Thus, each panorama includes a number of elements: a set of high-resolution photographs extending essentially 360° around a capture point, and depth or range information that details the distance(s) between the cameras and the physical structures; the location of the panorama (i.e., latitude, longitude, and elevation coordinates); and its orientation (i.e., the yaw, pitch, and roll of the vehicle when the panorama is captured). In addition or in the alternative to the laser rangefinder data, depth information for the panoramas can be extracted from sets of stereoscopic photographs. One example process for extracting depth information from the sets of stereoscopic photographs includes detecting corresponding points in the stereoscopic image pair using a feature descriptor like the scale-invariant feature transform (SIFT) and computing the intersections of the rays in three-dimensional space defined by the corresponding image points. Each image point defines a three-dimensional ray as the set of all points mapped to that image location by the camera. Determining this ray requires knowledge of the location and orientation of the camera as well as the internal camera model, which defines the pixel-to-ray mapping in the camera's reference frame. The internal camera model can be calculated using precise knowledge of the camera's optical properties, or the parameters of a finitely parameterized model can be estimated via a calibration procedure that uses photographs of carefully constructed objects (such as flat surfaces imprinted with checker or dot patterns of known size) to optimize the parameters of the model. The finitely parameterized model may be CAHVORE, which is a camera model used in machine vision for three-dimensional measurements. The CAHVORE model represents the transformation from the object domain to the image domain using vectors C, A, H, and V, corrects radial lens distortions with a vector O and a triplet R, and models apparent motion of the camera entrance pupil with the vector E.

As was described briefly above, prior to the tasks of method 10, the panoramas are analyzed to define a number of planes in them, and to assign each pixel in the images to one of the planes. Planes represent physical surfaces in the panoramas. Equations are used to define the planes, and pixel data provides information on which portions of the planes are seen in the panoramas. A plane may be defined by an equation of the form $\vec{n} \cdot \vec{x} + d = 0$, where $\vec{n}$ is a unit vector perpendicular to the plane and d is the distance from the plane to the coordinate origin. The point $\vec{x}$ is on the plane if the equation is satisfied. $\vec{n}$ is referred to as the normal vector of the plane, and d is referred to as the distance parameter. In addition to this equation, each plane is associated to a rectangular visible region on the plane with vertical and horizontal sides. (Method 10 assumes that a single physical entity may be visible from multiple locations, but these types of correspondences are not known in advance.) When method 10 begins in task 12, each of the panoramas is defined by a number of adjacent and intersecting planes, and each has a coordinate system whose origin is the center or capture point of the panorama.

A variety of methods can be used to perform these analysis and plane definition tasks; however, the algorithm disclosed in the commonly-assigned, U.S. Provisional Patent Application No. 61/679,006, filed on Aug. 2, 2012, entitled "Three-Dimensional Plane Panorama Creation Through Hough-Based Line Detection," and the PCT application with the same title and Application Number PCT/IB2013/056239 filed on Jul. 30, 2013 are incorporated by reference in their entirety.

Figure 2:
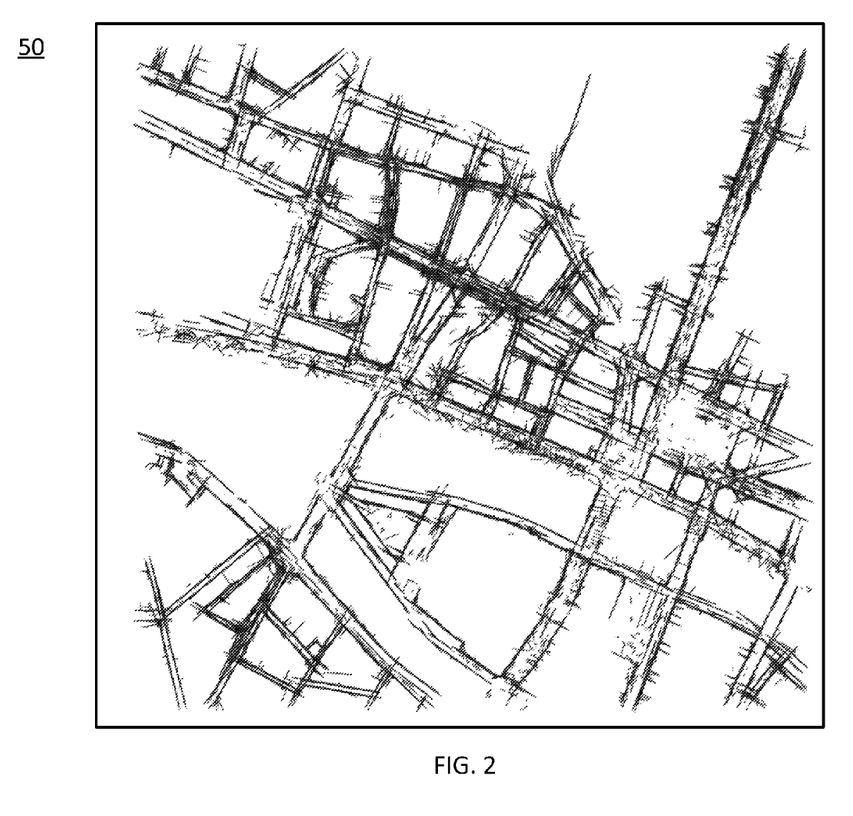
FIG. 2 is an illustration of an unfiltered panorama data set as it may exist prior to the method of FIG. 1.

As one example of the kind of data method 10 is intended to process, FIG. 2 is an illustration of an exemplary unfiltered plane panorama data set, generally indicated at 50. The size of the plane panorama data may be on the order of hundreds of meters or another scale. As can be seen in the unfiltered plane panorama data set 50, at the beginning of method 10, the data may not be very coherent: there may be extraneous planes in the panoramas, the planes may not be well aligned with each other, and planes in panoramas with adjacent visible regions may not be adjacent. Method 10 corrects these issues by displacing the panorama locations (and their associated planes) relative to one another to minimize the overall error, as will be explained below in more detail.

As shown in FIG. 1, method 10 continues with task 14. In task 14, if the locations of the panoramas are expressed in the latitude and longitude coordinate system, they are transformed to the Universal Transverse Mercator (UTM) coordinate system for ease in computation. The remaining tasks of method 10 may assume that all of the structures represented by a data set are in a single UTM zone, which provides for very little distortion. In UTM, a point comprises three components, which may be represented as (X, Y, Z). X and Y correspond to UTM Eastings and Northings respectively, and Z represents elevation.

However, methods according to the disclosed embodiments may be extended to situations in which the data set does not lie within a single UTM zone. Additionally, in other embodiments, other coordinate systems may be used. Once all location coordinates are expressed in the UTM coordinate system, method 10 continues with task 16.

One simplifying aspect of method 10 is that it breaks up the adjustments into two phases: X-Y correction, followed by Z correction. More particularly, method 10 seeks to adjust the two horizontal location components of the collection of panoramas in a UTM region before adjusting their relative elevations. This may provide for faster running times as compared to performing calculations based on the original number of dimensions of the data set.

Figure 3:
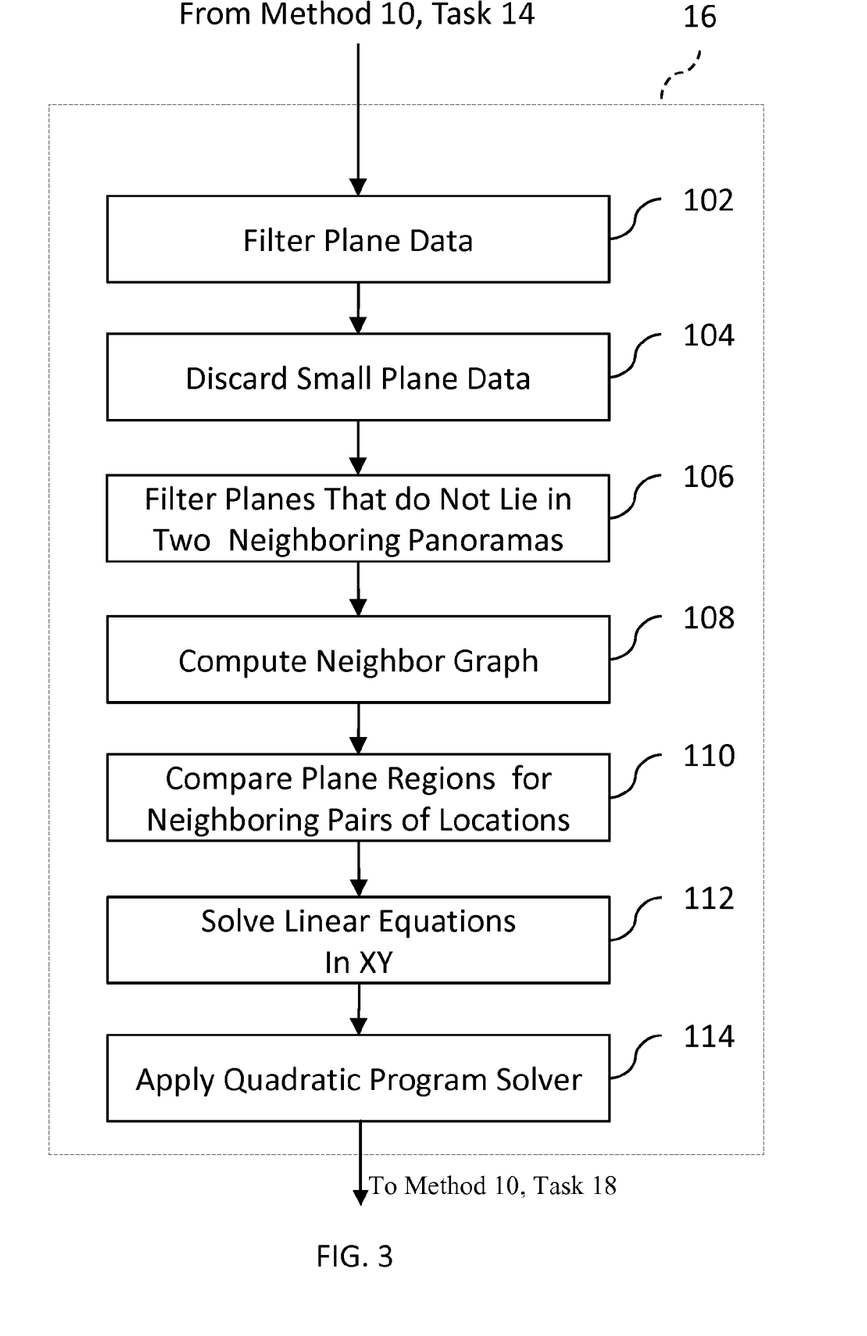
FIG. 3 is a flow diagram of a detailed method for performing XY coordinate correction in the method of FIG. 1.

Task 16 begins the location correction by correcting X and Y location values of the panoramas, and involves a number of sub-tasks. FIG. 3, a flow diagram, shows the major X and Y correction sub-tasks involved in task 16. Task 16 starts with sub-task 102, which entails filtering the panorama data set to remove planes with non-horizontal normals. On a typical street, most buildings are essentially vertical—only in the case of a few uniquely styled structures are the basic planes of the structure not vertical. Moreover, a vertical plane has a horizontal normal. For that reason, in task 16, any plane whose normal is not horizontal (to within a threshold tolerance) is thrown out. As one example, the threshold may be about 1%, such that to avoid being discarded in task 16, a plane must have a normal that is horizontal to within 1%. Once sub-task 102 is complete, task 16 continues with sub-task 104.

Task 16, sub-task 104 is an optional additional filtering task in which planes with visible regions that are below a specified size threshold are also discarded. This size threshold is selectable and may be varied based on the location and type of area that is being mapped. For example, in some areas, only planes with visible regions that are at least 20 meters long and 5 meters high are considered in method 10.

Although not shown in FIGS. 1 and 3, other filtering tasks may be included in method 10. For example, only planes that are visible from multiple, successive capture points may be used, in order to avoid including transient objects that do not form a permanent part of the area being mapped. Automobiles, people, and sidewalk signage, among other things, may fall into the transient object category. To determine whether a given plane seen from one capture point is visible from a neighboring capture point, the equation of the plane may be compared to the equations of all planes extracted from neighboring capture points. If some plane from a neighboring capture has a normal vector that is nearly parallel to the normal vector of the plane in question (e.g., within a tolerance of 5 degrees, 1 degree, 10 degrees, or another value) and a distance parameter nearly equal to the distance parameter of the plane in question (e.g., within a tolerance of 0.5 meters), then the plane in question may be deemed to be visible from that neighboring capture. Additionally, the user may manually manipulate variables, such as threshold values.

Figure 4:
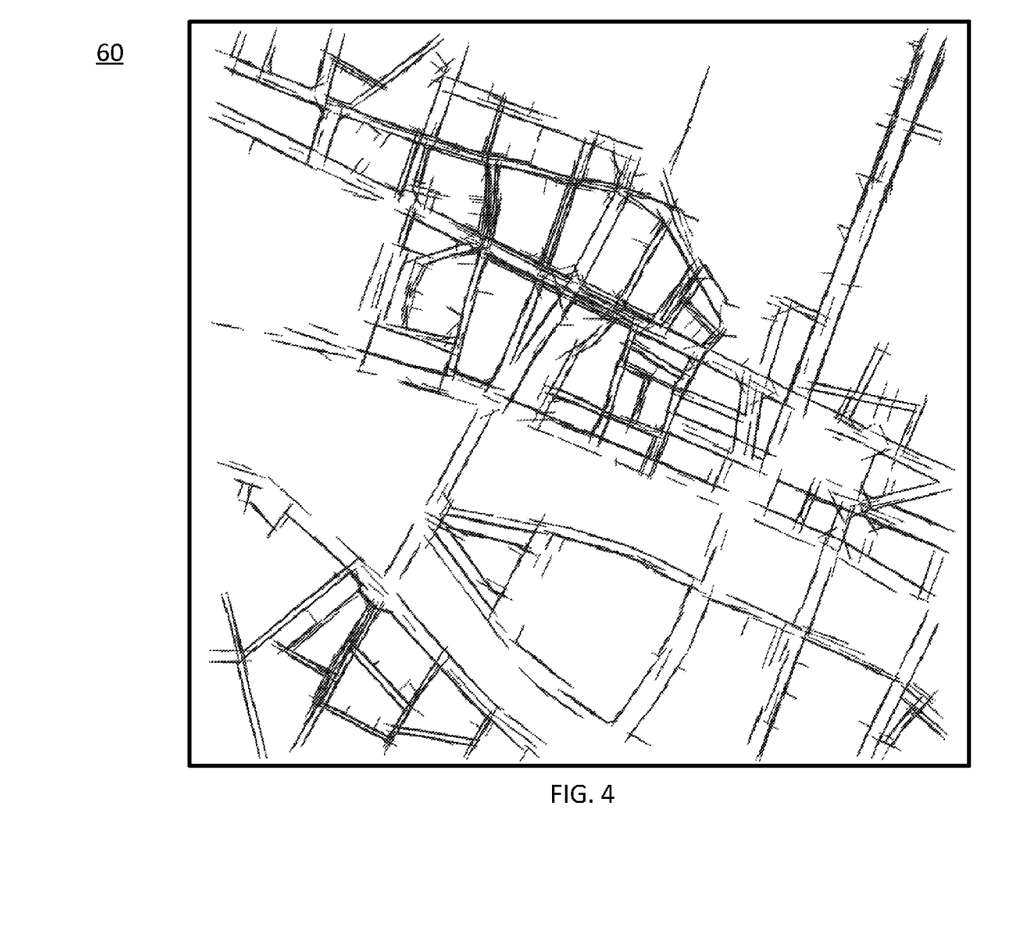
FIG. 4 is an illustration of the panorama data set of FIG. 2 after filtering.

FIG. 4 is an illustration of a panorama data set 60, which represents the same data as in panorama data set 50 of FIG. 2 after the filtering tasks described above. With the "noise" and extraneous planes removed, the discontinuities among individual planes are more apparent.

Task 16 continues with sub-task 108 of FIG. 3. In sub-task 108 a neighbor graph is computed. A neighbor graph defines which panoramas are neighboring and should be considered for location correction relative to one another. Not all panoramas need be considered for location correction in method 10. In general, panoramas are considered for correction relative to one another only if they are neighbors to within some defined distance threshold. A pair of panoramas may be considered neighbors if, for example, their XY locations are within a 30-meter threshold of each other, if the pair of panoramas are sequential, or if the user manually forces them to be neighbors by defining them as neighbors in the neighbor graph. Similarly, in sub-task 108, a user can specify that two panoramas that would otherwise be considered neighbors are not to be considered neighbors, either for some of the remaining tasks of method 10, or for all of them. The neighbor graph may differ in structure from embodiment to embodiment. In one embodiment of method 10, the neighbor graph may be a list of nodes, where every node is a pair of neighboring panoramas.

In the description above, it was explained that two panoramas are considered to be neighbors if they fall within some distance threshold of one another. In general, a threshold is a value that sets either a minimum or a maximum boundary of an operation. Thresholds may also comprise sets of values that define a space of operation. Task 14 allows the user to tune the thresholds to achieve the desired level of correction. The data set, as described above, may contain varying degrees of noise and inconsistencies. Choosing an appropriate threshold can be important: if a threshold is set too low, too few of the panoramas may be considered for correction.

In sub-task 108, there may be other special cases in which panoramas are added to the neighbor graph, if necessary. For example, occasionally, sequential panoramas can have a distance greater than the threshold value, such as when some source photographs, or source data originating from the photographs, are discarded for quality or other reasons. In XY correction, these designated sequential panoramas may be given larger weighted values in later tasks and sub-tasks of method 10.

Furthermore, in the course of constructing the neighbor graph in sub-task 108, method 10 may remove certain edges from the neighbor graph. (Note in the following that whenever the edge (p, q) belongs to the neighbor graph, the edge (q, p) does as well: if p is a neighbor to q, then q is a neighbor to p.) For example, suppose p, q, and r are three panoramas. If the neighbor graph contains the edges (p, q), (q, r), and (p, r) (i.e., a graph-theoretic triangle), the edge (p, q) is sequential, and the angle in the XYZ formed by the path (p, q, r) is obtuse (i.e., between 90 and 180 degrees), then the edges (p, r) and (r, p) are deleted from the neighbor graph. This preserves the essential connectivity of the neighbor graph while greatly reducing the number of edges, thus speeding up the later optimization steps. In another example, edges may be removed from the neighbor graph that form an angle in another predetermined range. The limits on the predetermined range may vary by a few (e.g., 1, 2, or 5) degrees.

In a similar example, the construction of the sub-task 108 may remove redundant edges through an edge deletion strategy that identifies when an edge (p, r) goes between two sequential panoramas. When an endpoint (p) of the edge is moved to make the edge shorter and comes in contact with another edge (q, r) before the length is minimized along the line through p and q, then the edge (p, r) is redundant and may be removed.

Task 16 continues with sub-task 110. Sub-task 110 is concerned with determining which of the nodes (i.e., panoramas) retained in the neighbor graph should have their locations corrected. Notably, sub-task 110 operates on a "clean" set of plane panoramas in the neighbor graph—by this point in method 10, sub-tasks 102-106 have removed irrelevant (i.e., "noisy") planes from the data set, simplifying the data set and eliminating noise that would otherwise make sub-task 110 more difficult.

Sub-task 110 first finds planes of neighboring pairs of panoramas that are nearly parallel to within a threshold, e.g., within 5°. Each neighboring pair of planes is marked as a tentative match. Following that, sub-task 110 continues by locating tentative matches of neighboring pairs that are nearly opposite one another. These types of panorama pairs may define, for example, different sides of the same street, and are most helpful to correct in method 10.

Once neighboring parallel and opposite tentative matches are made, sub-task 110 then continues by deciding which matches to retain in the data set. This is done to further prevent false matches. Tentative parallel neighboring matches that do not have opposite matches are thrown out. Tentative matches whose heights do not match or whose widths of supposed streets differ are also thrown out. Sub-task 110 may consider heights that differ, for example, within a factor of two and street widths that differ by more than one meter. Once the surviving neighboring panoramas are determined, task 16 continues with sub-task 112.

Sub-task 112 determines linear equations in the X and Y coordinates of panorama data in a UTM region. Each pair of matched planes in neighboring panoramas yields one linear equation in the two panoramas' coordinates. In the aggregate, these individual linear equations form a system of linear equations, which can be represented by and manipulated with matrix operations.

The equation corresponding to each matched pair of planes is constructed to fit a defined constraint, namely that the planes coincide (as closely as possible) after the locations of their respective panoramas are adjusted. However, the collection of constraints imposed on sets of neighbors is likely to be inconsistent and may vary from set to set; therefore, as will be described below in more detail, sub-tasks 112-114 minimize a weighted absolute sum of errors for the individual constraints (i.e., a weighted norm of the error vector). Weight may be added to the error terms for particular neighbors in order to avoid displacing those panoramas from their existing "good" locations while solving the minimization problem. The following description gives specific examples of how linear equations are constructed in sub-task 112 of method 10. The following linear equation examples demonstrate calculations using two locations for clarity in explanation. However, in actual implementations of method 10, any set of data will generate a plurality of equations. Assume, for example, that there are two neighboring panoramas with respective locations $P_i$ and $P_j$, and a matching pair of planes, $(\theta_0, r_0)$ and $(\theta_1, r_1)$, where $\theta_a$ is the angle of the normal vector in the xy-plane (pointing from the plane to the capture location) and $r_a$ is the distance from the capture location to the plane (where a is 0 or 1). Let $\theta$ be the average of $\theta_0$ and $\theta_1$ (there being no ambiguity, since $\theta_0$ and $\theta_1$ are approximately equal), and let $\vec{v}=(\cos\theta, \sin\theta)$. Assuming that the planes actually have angle exactly theta, the condition that they coincide imposes the following constraint on the new, corrected locations $\hat{P}_i$, $\hat{P}_j$ of the two panoramas $$(\hat{P}_i - \hat{P}_j)_{xy} \cdot \vec{v} = r_0 - r_1 \quad (1)$$

Here, $(u)_{xy}$ denotes the two horizontal (x and y) components of the three-dimensional vector u. In essence, equation (1) requires that the dot product of the difference between the new, corrected locations and the vector v be equal to the difference between the distances to the capture location for the two planes. Since the new, corrected location of any particular panorama is equal to the original location plus some unknown displacement, represented by a delta, equation (1) can be written as:

$$\hat{P}_a = P_a + \vec{\delta}_a (a=i,j)$$

$$(\vec{\delta}_i - \vec{\delta}_j)_{xy} \cdot \vec{v} = r_0 - r_1 - (P_i - P_j)_{xy} \cdot \vec{v} \quad (2)$$

Sub-task 112 continues to consider certain special cases. If the equations for any one edge in the neighbor graph are close to being singular (e.g., rank of the matrix less than 2), sub-task 112 adds extra equations to improve the conditioning of the problem and prevent instability, e.g.:

$$(\vec{\delta}_i - \vec{\delta}_j)_{xy} \cdot \vec{w} = 0 \quad (3)$$

In equation 3 $\vec{w}$ represents one or more vectors. Once the sets of linear equations in X and Y are computed for all neighboring pairs of panoramas, task 16 continues with sub-task 114.

At the beginning of sub-task 114, there are usually more equations that describe the system than would be needed to solve the system, i.e., the system is over determined. Thus, instead of trying to solve the system of equations exactly, sub-task 114 creates an optimization problem to solve them approximately. Specifically, sub-task 114 applies a semidefinite quadratic program solver to the system of linear equations calculated in sub-task 112. The semidefinite quadratic program solver may be any type of convex quadratic solver. The equations used in sub-task 112 may be expressed generally and succinctly in the form:

$$A\delta = b \quad (4)$$

where A is a certain sparse matrix, b is a certain vector, and $\delta$ is a vector whose components are the x and y components of all the vectors $\vec{\delta}_a$ defined in equation (2). Equation (4) allows the linear data of sub-task 112 to be used in conventional quadratic problem solving, leading to horizontal location correction, which is the objective of sub-task 114. Specifically, sub-task 114 minimizes the function of equation (5) below over delta:

$$\text{Error}(\delta) = \sum_{i=1}^{m} \left[ w_i^{(L)} |(A\delta - b)_i| + \frac{1}{2} w_i^{(Q)} (A\delta - b)_i^2 \right] \quad (5)$$

In equation (5), $w^{(L)}$ and $w^{(Q)}$ are fixed vectors of linear and quadratic weights, respectively, and m is the number of equations constructed in sub-task 112. Equation (5) defines a convex function in the unknown $\delta$, and the value of $\delta$ that minimizes Error($\delta$) can be obtained using standard convex optimization algorithms.

In these calculations, the linear weight for an equation is defined such that it decays exponentially as a function of the angle difference (i.e., the absolute value of $\theta_0 - \theta_1$) from the results of sub-task 112. Weight is dependent on the distance between two locations, since each equation involves exactly two locations. Equation (6) below is one example of how the linear weights for equation (5) may be defined:

$$w_k^{(L)} = \exp\left(-\frac{2(\theta_i - \theta_j)\left(\frac{180}{5\pi}\right)}{\left(1 + \frac{d_k}{30\text{ m}}\right)^2}\right) \quad (6)$$

Here, equation k involves two planes with normals having horizontal angles $\theta_i$ and $\theta_j$ and belonging to captures that are distance $d_k$ apart (the distance in the equation being normalized by dividing by 30 meters). In equation (5), the quadratic weight, $w_i^{(Q)}$, for each linear equation i is generally zero, except for certain situations in which it is desired to avoid displacing panoramas relative to one another, in which case a large quadratic weight can be used in the calculations for particular equations. In mathematical terms, a large quadratic weight makes it much less likely that an equation will be grossly violated during the minimization of error. For example, if the equation is already almost satisfied, e.g., the distance between locations is 1 meter or under, then it is automatically assigned a large quadratic weight, e.g., $w_i^{(Q)} = 10$.

Additionally, the user may specify that the equations for a particular edge between neighboring panoramas have a large quadratic weight, which will tend to avoid displacing that edge. Sequential edges between neighboring panoramas are also given larger weight in sub-task 114, because these are essentially already aligned. Non-zero quadratic weights also make it much less likely that the equation fails. Solving the convex optimization problem results in a modified horizontal component for each location.

In addition to the tasks described above, it may be useful or necessary in some circumstances to add constraints in sub-task 114 in order to ensure that the system has sufficient constraints to be solved. That may mean using available data to determine that the location of a panorama is "good" and should not be displaced during sub-task 114. For example, if the standard deviation for the location of a panorama, taken from an inertial navigation system, is sufficiently low (e.g., less than 0.2 m for XY-correction and less than 0.1 m for Z-correction), $\vec{\delta}_i = 0$ may be used as a hard constraint in equations (4) and (5). Additionally, in order to minimize computational time, the neighbor graph may be broken into its connected components before beginning sub-tasks 112 and 114.

Figure 5:
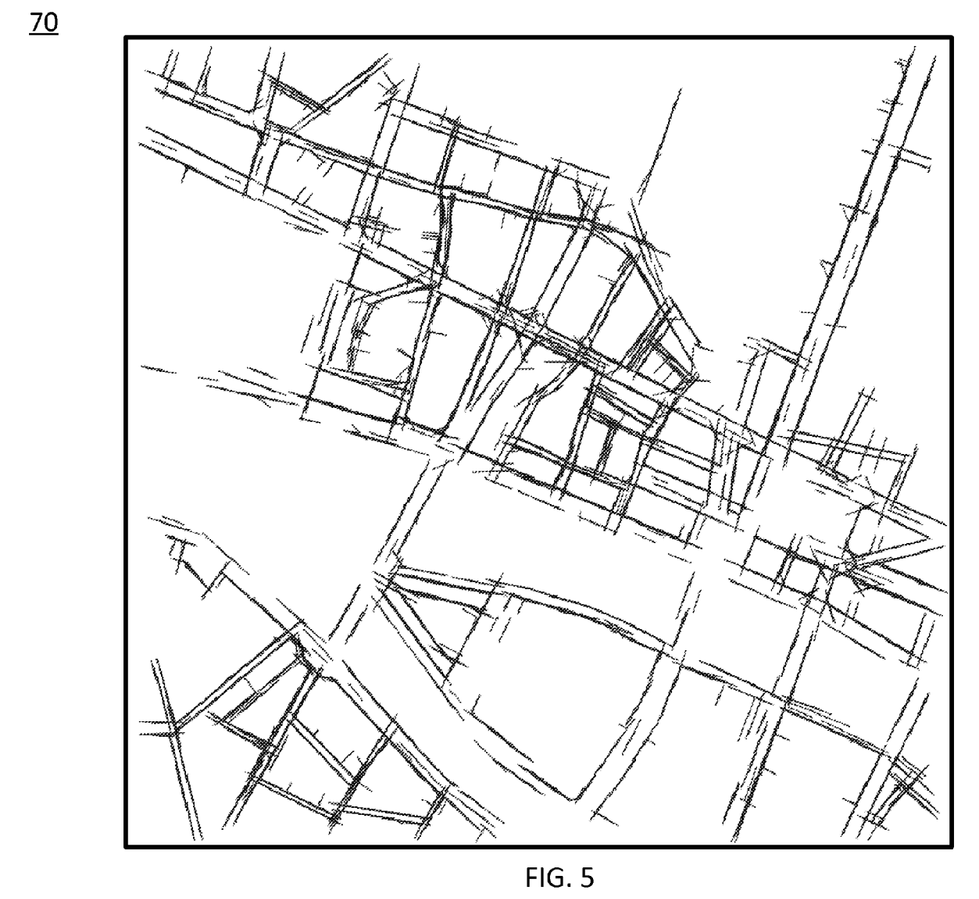
FIG. 5 is an illustration of the panorama data set of FIG. 4 after XY coordinate correction.

Once sub-task 114 is complete, XY corrections have been calculated and applied for each remaining panorama. FIG. 5 illustrates a plane panorama data set 70, which results from applying XY corrections to the plane data set 60 of FIG. 4. As can be seen, the planes of the various panoramas coincide more readily and are better aligned. Note, however, that some of the planes extend farther than they should, crossing other planes. For that reason, among others, it may be helpful to apply a method for line and plane detection that deals with these issues (like the one incorporated by reference above) before applying location correction methods.

Figure 6:
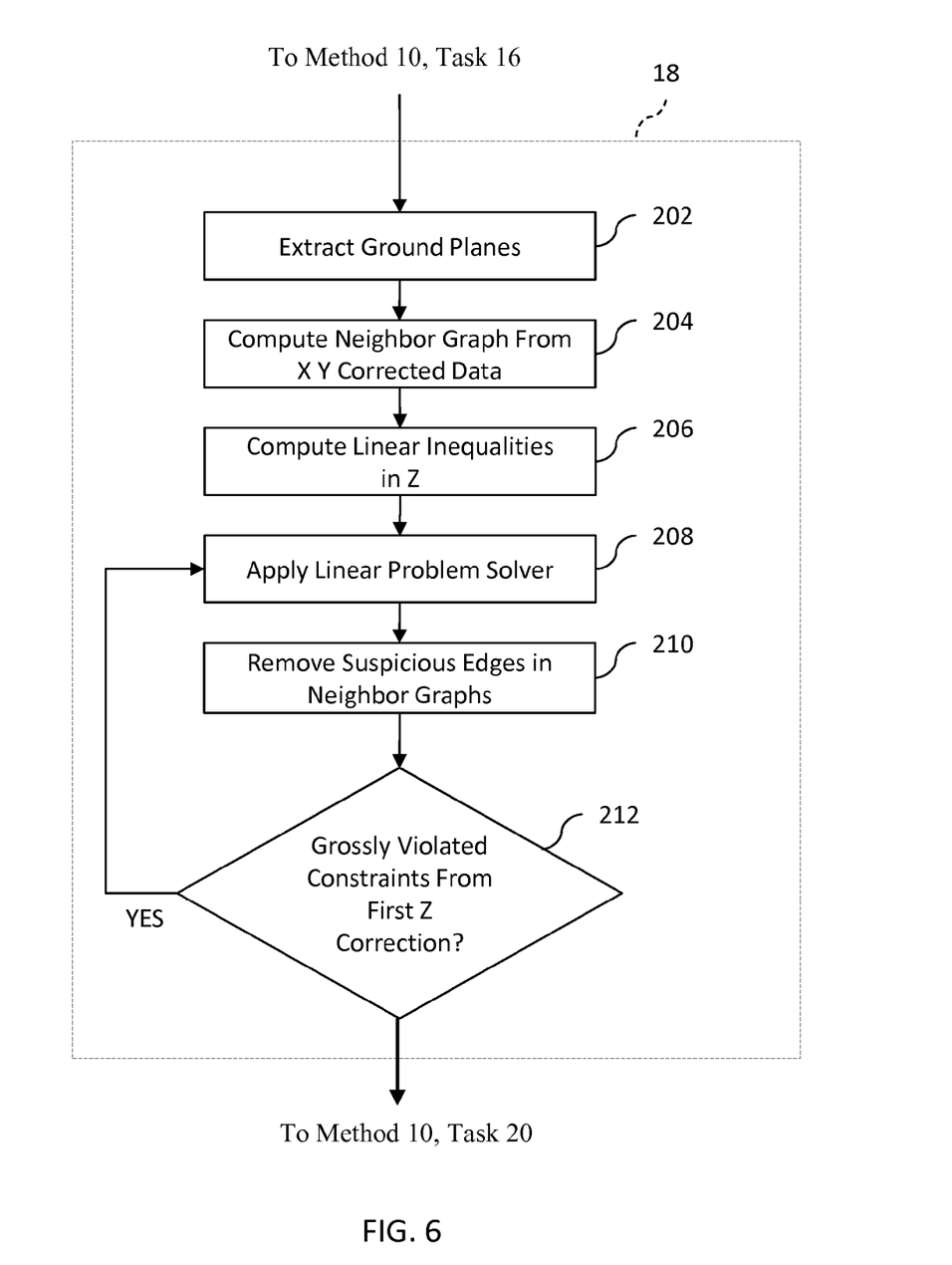
FIG. 6 is a flow diagram of a detailed method for performing Z coordinate correction in the method of FIG. 1.

As shown in FIG. 1, once XY correction is complete, method 10 continues with task 18, which continues panorama location correction by correcting the Z locations, or elevations, in each panorama. FIG. 6, a high level flow diagram, shows the major Z location correction sub-tasks involved in task 18. As will be explained in more depth below, Z correction is similar to X and Y correction with certain exceptions.

Task 18 starts with sub-task 202, in which ground planes are extracted. A major difference between the XY correction of task 16 and the Z correction of task 18 is that task 18 uses ground planes, whereas task 16 uses vertical planes. In sub-task 202, ground planes are extracted from the plane data for each panorama. Each panorama is assumed to have an identified ground plane, or one that can be identified easily from other data.

If a ground plane is not identified in advance among the set of planes for a panorama, then a ground plane generally can be identified by selecting a plane whose normal vector is close to being vertical. When the collection system is mounted rigidly on a vehicle, the normal vector of the ground directly underneath the vehicle essentially has a constant value (e.g., within a small range) in the vehicle's reference frame (e.g., the unit vector pointing directly away from gravity when the vehicle is resting on level ground, which may be known in advance) may be used to reliably find the ground plane. Additional information, such as the distance of the vehicle's coordinate origin from the ground, may be used to calculate the ground plane. Note that, as compared with task 16 above, ground planes themselves do not need to be parallel, which will be taken into account in later calculations. Once ground planes are detected, task 18 continues with sub-task 204.

Sub-task 204 recalculates the neighbor graph. Since Z correction takes place after XY correction, and the panoramas will have new X and Y coordinates, the neighbor graph is re-calculated. The neighbor graph is typically re-calculated using the same technique described in task 16, sub-task 108. Once calculating the neighbor graph is complete, task 18 continues to sub-task 206.

Sub task 206 computes linear inequalities in Z. Sub-task 206 computes linear inequalities using the same general techniques as task 14, sub-task 112, with the exception that panoramas are considered for correction based on their ground planes, instead of their vertical planes. Z correction is accomplished in part by using $L^1$ minimization instead of $L^2$ minimization on the ideal constraints, which allows a small number of constraints to be grossly violated without a large penalty.

As was noted briefly above, sub-task 208 applies a linear program or problem solver for Z correction. The linear program or problem solver involves the same type of computations used in task 16, sub-task 112, but applies hard constraints instead of using quadratic programming. Because sub-task 208 uses linear inequalities to define the ideal set of constraints, sub-task 208 seeks to satisfy the constraints so that the problem is not subject to over optimization. Ultimately, these hard constraints seek to minimize an error term, which will be described below.

First, if $P_i$ is the coordinate triple of a panorama, $\vec{n}_i$ is the unit normal vector of the ground plane (pointing from the plane to $P_i$), and $d_i$ is the distance from $P_i$ to its ground plane, the nearest point to $P_i$ on the ground plane, $P_i^{(g)}$, can be defined as:

$$P_i^{(g)} = P_i - \vec{n}_i n_i \qquad (7)$$

In sub-task 208, the displacements of the ground planes is constrained by assuming that the intersection of two ground planes, represented by i and j in equation (7) and the following equations, is between $P_i^{(g)}$ and $P_j^{(g)}$. Given the mathematical expressions of the problem in equations (8)-(11) below:

$$f_1 = (P_i^{(g)} - P_j^{(g)}) \cdot \frac{\vec{n}_J}{(\vec{n}_J)_z} \qquad (8)$$

$$f_2 = (P_j^{(g)} - P_i^{(g)}) \cdot \frac{\vec{n}_I}{(\vec{n}_I)_z} \qquad (9)$$

$$b_1 = \max(f_2, -f_1) + a \qquad (10)$$

$$b_2 = \max(-f_2, f_1) + a \qquad (11)$$

(where $(u)_z$ denotes the z (vertical) component of the vector u), the constraints would be $$(\vec{\delta}_i - \vec{\delta}_j)_z \leq b_1 \qquad (12)$$

$$(\vec{\delta}_i - \vec{\delta}_j)_z \leq b_2 \qquad (13)$$

The variable a in equations (10) and (11) is a tunable distance value that, when greater than zero, allows the intersections of the two ground planes not to lie between $P_i^{(g)}$ and $P_j^{(g)}$ by a small amount. A typical value is 0.1 m; other possible values include 0.05 m, 1 m.

The constraint inequalities of equations (12) and (13) are generally over-determined, so instead of using them directly, an error vector is introduced:

$$\text{Error}(\delta)_k = \max(0, (\vec{\delta}_i - \vec{\delta}_j)_z - b_1, (\vec{\delta}_j - \vec{\delta}_i)_z - b_2) \quad (14)$$

In the above, the max( ) function refers to finding the maximum of the expressions listed. In other words, the error is set equal to either zero or the result of one of the two difference expressions. The error vector $\text{Error}(\delta)$ has one component $\text{Error}(\delta)_k$, defined by equation (14), for each neighboring pair of panoramas $(P_i, P_j)$.

Sub-task 208 seeks to minimize the dot product of a vector of weights, w, and the error term of equation (14) above:

$$WeightedError(\delta) = \sum_{k=1}^{m} w_k \text{Error}(\delta)_k$$

where m is the number of pairs of neighboring panoramas considered in sub-task 208. As shown in FIG. 6, sub-task 208 may be repeated a number of times under conditions that will be described below in more detail.

The error minimization of sub-task 208 takes two conditions into account. First, an inequality's weight is smaller if it was already violated in a previous iteration of sub-task 208. Second, if an inequality is violated by more than a threshold distance, such as 4 m, or by more than 1 m if the XY distance between the locations is more than 15 m, then the edge is considered suspicious. Each suspicious edge has its vertical planes compared and weights are adjusted according to how many edge matches there are, e.g., the more the matches, the smaller the adjustment.

It is also possible for some inequalities in the system to be exactly satisfied before correction but broken after correction. To prevent this, a hard constraint may be used, e.g.:

$$\text{Error}(\delta)_k \leq \max(\text{Error}(0)_k, 0.1 \text{ m}) \quad (15)$$

where Error(0) is the error with no deltas applied, i.e., the error before correction is attempted. The constraint of equation (15) requires that the error for an inequality be less than or equal to the larger of the current error or some small threshold distance, in this case 0.1 m. In another example, the small threshold distance is 0.5 m, 1 m, or 4 m.

The use of hard constraints simplifies the linear programming needed to perform Z correction. Similarly, the user may designate certain edges of neighboring panoramas as "important" by assigning certain edges larger weights (e.g., by a factor of 4) and using a smaller hard error tolerance (e.g., a maximum of 0.5 meters). If the program becomes unsolvable, hard error tolerances may be raised. Once sub-task 208 is completes, task 18 continues with sub-task 210.

Sub-task 210 removes suspicious edges in neighbor graphs. At the conclusion of sub-task 210, task 18 continues to sub-task 212. Sub-task 212, a decision, determines if there are neighboring locations with grossly violated constraints. For example, as was described briefly above, if a distance constraint is violated by more than 0.1 m, then a gross violation of constraints exists (task 18, sub-task 212:YES). In that case, control of method 10 is returned to sub-task 208, and task 18 continues from that point. If there are no grossly violated constraints at the conclusion of sub-task 212 (task 18, sub-task 212:NO), then task 18 is complete and method 10 completes and returns at task 20.

Figure 7:
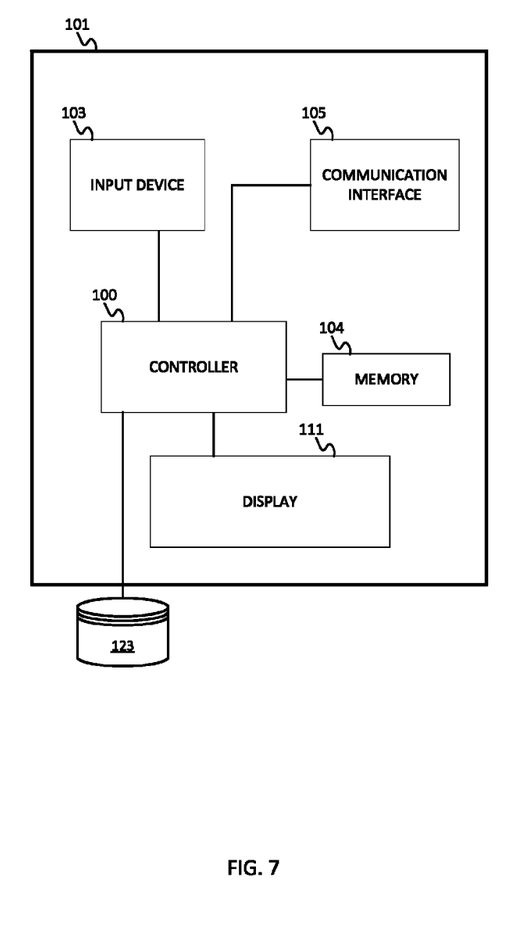
FIG. 7 is an example of a computing device for panorama location correction in three-dimensional mapping.

FIG. 7 is an example of a computing device 101 for panorama location correction in three-dimensional mapping. The computing device 101 includes a controller 100, an input device 103, a memory 104, a communication interface 105, a display 111, and a database 123. Additional, different, or fewer components may be provided. The computing device 101 is configured to perform any of the embodiments described above.

In one example embodiment, the communication interface 105 receives panorama image data including pixels associated with depth or range information that details the distance between the camera and physical structures depicted in the panorama image data. The depth or range information may describe locations of the panorama image data from another frame of reference. The panorama image data may extend essentially 360 degrees or another angle range.

The controller 100 is configured to analyze the locations of the pixels to define planes in the panorama image data. The planes represent physical surfaces or physical objects. The controller 100 is configured to filter the planes. In one example, the controller 100 removes planes that include non-horizontal normal. Thus, only planes represented substantially vertical objects are surfaces are retained. The term substantially vertical object may include objects oriented in parallel with the direction of gravity or within a predetermined range with the direction of gravity. Examples for the predetermined range include 1 degree, 3, degrees, or 10 degrees. In another example, the controller 100 is configured to remove planes that are too small. The controller 100 may compare a dimension or area of planes to a size threshold and discard planes that do not meet the size threshold. One example size threshold may be 10, 50, or 100 square meters. Another example size threshold is 5, 10, or 100 meters in a specific dimension. The specific dimension may be the vertical direction, the horizontal direction, or the longest dimension for the plane under analysis.

The controller 100 is configured to computer a neighbor graph. The neighbor graph plots the panorama image data versus location. The neighbor graph may be presented by display 111. The neighbor graph is configured to identify sequential panoramas. The neighbor graph may be used to further filter the planes to identify extraneous or unnecessary planes. The controller 100 is configured to identify pairs of panoramas as described above.

The controller 100 derives a linear equation from each pair of matched planes in neighboring panoramas. Accordingly, the controller 100 establishes a set of linear of linear equations having a number of equations equal to the number of pairs of matched planes or matched panoramic images.

The linear equation for each pair of matched planes is derived by controller 100. Equation 16 illustrates the relationship between a matched pair of planes. The planes may be defined by a distance (R) from the capture location of the camera to the center of the plane. An angle (θ) is the angle of the normal vector from the plane to the capture location. A matrix V is defined as $[\cos(\theta), \sin(\theta)]$.

$$(\hat{P}_i - \hat{P}_j)_{xy} \cdot V = R_0 - R_1 \quad (16)$$

The controller 100 is configured to adjust equation 16 for the unknown displacement between the corrected locations $(P_i, P_j)$ of two panorama and the original location, as shown by equation 17. The controller 100 combines multiple linear equations, for example, in matrix form as shown by equation 18, is configured to solve the linear equations to for pairs of neighboring panoramic images for new locations for the panoramic images. The controller applies the new locations to the panoramic images. $\hat{P}_i = P_i + \Delta_i$ $$(\Delta_i - \Delta_j)_{xy} \cdot V = R_0 - R_1 - (P_i - P_j)_{xy} \cdot V \quad (17)$$

$$A\Delta = b \quad (18)$$

The memory 104 may be a non-transitory computer-readable medium. While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The input device 103 may be one or more buttons, keypad, keyboard, mouse, stylist pen, trackball, rocker switch, touch pad, voice recognition circuit, or other device or component for inputting data to the computing device 101. The input device 103 and the display 111 may be combined as a touch screen, which may be capacitive or resistive. The display 111 may be a liquid crystal display (LCD) panel, light emitting diode (LED) screen, thin film transistor screen, or another type of display.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention. While the invention has been described with respect to certain embodiments, the embodiments are intended to be exemplary, rather than limiting. Modifications and changes may be made within the scope of the invention.

What is claimed is:

1. A method for correcting locations of panoramas and physical locations in a universal transverse mercator region, comprising:
    identifying, using a processor, neighboring panoramas in an XY coordinate system, each of the neighboring panoramas having a number of planes defining structures and surfaces in the panorama;
    identifying, using the processor, a subset of the number of planes, each of the subset having a horizontal normal within a threshold;
    constructing, using the processor, a system of linear equations to represent the locations of the panoramas in the XY coordinate system, in which pairs of linear equations representing pairs of neighboring panoramas are required to be within specified threshold distances of one another, plus or minus an error term;
    minimizing, using the processor, a weighted absolute sum of the error terms across the system of linear equations using a semidefinite quadratic program solver to define new XY locations for the neighboring panoramas; and
    storing the new XY locations to the neighboring panoramas in a three dimensional map.

2. The method of claim 1, further comprising:
    identifying ground planes in the neighboring panoramas;
    constructing a system of linear inequalities to represent the locations of ground planes in the neighboring panoramas along a Z axis of the XY coordinate system, in which pairs of linear equations representing the ground planes of the neighboring panoramas are required to be within specified threshold distances of one another, plus or minus a ground plane error term;
    minimizing a weighted absolute sum of the ground plane error terms across the system of linear inequalities using a linear program solver to define new Z locations for the neighboring panoramas; and
    applying the new Z locations to the neighboring panoramas.

3. The method of claim 2, further comprising filtering and discarding planes in the panoramas that do not meet defined thresholds.

4. The method of claim 2, wherein identifying the neighboring panoramas comprises constructing a neighbor graph.

5. A method comprising:
    comparing, using a processor, separation distances between locations of panoramic images to a threshold;
    filtering, using the processor, the panoramic images to remove panoramic images below a predetermined size;
    identifying, using the processor, a first pair of neighboring panoramic images separated by less than the threshold;
    identifying, using the processor, a second pair of neighboring panoramic images separated by less than the threshold;
    constructing, using the processor, a first equation for the first pair of neighboring panoramic images and a second equation for the second pair of neighboring panoramic images;
    calculating, using the processor and from at least the first equation and the second equation, at least one new location for at least one of the first pair of neighboring panoramic images or at least one of the second pair of neighboring panoramic images; and
    storing the at least one new location in a three dimensional map.

6. The method of claim 5, wherein calculating the at least one new location comprises:
    minimizing a weighted absolute sum of error terms across the first equation and the second equation.

7. The method of claim 6, wherein the quadratic program solver is semidefinite.

8. The method of claim 5, further comprising:
adjusting at least one of the first pair of neighboring panoramic images or at least one of the second pair of neighboring panoramic images in a first direction and a second direction according to the new location.

9. The method of claim 5, wherein pixels in the neighboring panoramic images are assigned to one or more planes representing physical structures or surfaces.

10. The method of claim 5, further comprising:
filtering the panoramic images to remove panoramic images with at least one non-horizontal normal.

11. The method of claim 5, further comprising:
generating a neighbor graph including the first pair of neighboring panoramic images and the second pair of neighboring panoramic images; and
removing at least one edge from the neighbor graph according to an angle between consecutive edges.

12. An apparatus comprising:
at least one processor; and
at least one memory including computer program code for one or more programs, the at least one memory and the computer program code configured to, with the at least one processor, cause the apparatus to perform at least the following:
identifying, from a set of panoramic images, a plurality of pairs of neighboring panoramic images separated by less than a threshold distance;
filtering the set of panoramic images to remove panoramic images with at least one non-horizontal normal;
generating a system of equations for the filtered plurality of pairs of neighboring panoramic images;
solving the system of equations for the plurality of pairs of neighboring panoramic images for a new location; and
storing the new location to a location value assigned to at least one of the neighboring panoramic images in a three dimensional map.

13. The apparatus of claim 12, the computer program code configured to, with the at least one processor, cause the apparatus to further perform:
minimizing a weighted absolute sum of error terms across the first equation and the second equation using a quadratic program solver.

14. The apparatus of claim 12, wherein pixels in the neighboring panoramic images are assigned to one or more planes representing physical structures or surfaces.

15. The apparatus of claim 12, the computer program code configured to, with the at least one processor, cause the apparatus to further perform:
filtering the set of panoramic images to remove panoramic images below a predetermined size.

16. The apparatus of claim 12, the computer program code configured to, with the at least one processor, cause the apparatus to further perform:
generating a neighbor graph including the set of panoramic images; and
removing at least one edge from the neighbor graph according to an angle between consecutive edges.

17. The apparatus of claim 12, wherein one of the plurality of pairs of neighboring panoramic images includes images of different sides of a street.

18. The apparatus of claim 12, wherein the system of equations for the plurality of pairs of neighboring panoramic images includes a first correction in a horizontal direction and a second correction in a vertical direction.

* * * * *